(12) United States Patent
Chatterjee

(10) Patent No.: US 6,593,004 B1
(45) Date of Patent: Jul. 15, 2003

(54) EXTRUSION COATING COMPOSITION

(75) Inventor: Ananda M. Chatterjee, Katy, TX (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 481 days.

(21) Appl. No.: 09/172,544

(22) Filed: Oct. 14, 1998

(51) Int. Cl.$^7$ ............... B32B 27/08; B32B 27/32; B32B 27/34

(52) U.S. Cl. ............... 428/516; 442/62; 442/155; 442/164; 442/168; 442/171; 524/128; 526/348; 526/351

(58) Field of Search .................. 526/159, 160, 526/943, 348, 351, 352; 524/128, 400; 428/516; 427/428; 442/62, 155, 164, 168, 171

(56) References Cited

U.S. PATENT DOCUMENTS

| | | | |
|---|---|---|---|
| 3,418,396 A | | 12/1968 | Edwards et al. ............. 260/897 |
| 3,887,640 A | | 6/1975 | Diaz et al. ............... 260/876 B |
| 4,916,198 A | * | 4/1990 | Scheve et al. ............... 526/351 |
| 5,547,766 A | | 8/1996 | Gobran ........................ 428/515 |
| 5,597,881 A | | 1/1997 | Winter et al. ................ 526/348 |
| 5,660,789 A | * | 8/1997 | Spagnoli et al. ............. 264/555 |
| 5,674,630 A | * | 10/1997 | Chatterjee ................... 428/500 |
| 5,820,981 A | * | 10/1998 | William et al. .............. 428/364 |

FOREIGN PATENT DOCUMENTS

| | | | | |
|---|---|---|---|---|
| EP | 588581 | | 3/1994 | ......... C08F/297/08 |
| GB | 2 258 869 A | * | 2/1993 | |
| GB | 2258869 | | 2/1993 | ........... C08L/23/12 |

* cited by examiner

*Primary Examiner*—Robert D. Harlan

(57) ABSTRACT

This invention relates to novel extrusion coating compositions containing certain high melt flow, narrow molecular weight distribution polypropylene impact or random copolymers and composite articles comprising a substrate having such compositions melt extruded thereon.

16 Claims, No Drawings

EXTRUSION COATING COMPOSITION

FIELD OF THE INVENTION

This invention relates to novel extrusion coating compositions containing certain polypropylene polymers and solid substrates extrusion coated with such compositions.

BACKGROUND OF THE INVENTION

Solid substrates extrusion coated with polypropylene resins are known in the art. However, polypropylene resins have heretofore been found to be deficient when used alone in extrusion coating process and thus require blending with other resins and/or additional treatment of the substrate. U.S. Pat. No. 3,418,396 teaches blending polyethylene with polypropylene for improving extrusion coating onto Kraft paper. Additionally, U.S. Pat. No. 3,887,640 describes extrusion coating of blends of ethylene-propylene impact copolymers and polyethylene.

SUMMARY OF THE INVENTION

This invention relates to novel extrusion coating compositions containing certain high melt flow, narrow molecular weight distribution impact or random polypropylene copolymers and to substrates extrusion coated with such compositions. The novel coating compositions can be directly extrusion coated onto a substrate without blending with polyethylene or other polymers and without special preparation or treatment of the substrate. A good balance of properties including adhesion, edge weaving, surging and neck-in is achieved in the process of extrusion coating such compositions onto a suitable substrate.

DETAILED DESCRIPTION OF THE INVENTION

Extrusion Coating Compositions

The novel coating compositions of the present invention contain a propylene polymer selected from the group consisting of high melt flow, narrow molecular weight distribution versions of certain high impact polypropylene copolymers and certain propylene-ethylene random copolymers. These polypropylene polymers may be used alone without blending with other polymers such as polyethylene to achieve satisfactory results in the preparation of extrusion coated composite structures. In addition to the polypropylene polymers, the novel extrusion coating compositions of this invention preferably contains a particular combination of additives as is described in more detail below.

The homopolymer phase of the high impact copolymers useful in the compositions of present invention is preferably a propylene homopolymer, but it is understood that it may contain up to 5%w of comonomer, including but not limited to, $C_2$ and $C_4$–$C_8$ alpha-olefins, such as 1-butene and ethylene, and dienes, such as 5-ethylidene-2-norbornene (ENB), and 7-methyl-1,6 octadiene. The mole ratio of olefin to propylene in this homopolymer phase is about 0 to about 0.06 and, preferably, when present, is about 0.015 to about 0.04.

The rubber phase of the high impact copolymers useful in the present invention is a copolymer of ethylene and propylene. The ethylene content ($E_c$) of the rubber phase is between about 50%w to about 60%w, more preferably between about 50%w and about 55%w. The amount of rubber phase ($F_c$) in the high impact copolymer ranges between about 10%w to about 35%w and preferably about 20%w to about 30%w based on the total weight of the impact copolymer. The melt flow (MF) of the high impact copolymer is between about 30 dg/min to about 70 dg/min, (as determined by ASTM D-1238, Cond. L) preferably about 40 dg/min to about 50 dg/min, produced either in the reactor or by controlled rheology (cracking or visbreaking) modes.

The ratio of intrinsic viscosity of the rubber phase to the intrinsic viscosity of the homopolymer phase referred to as the intrinsic viscosity ratio or beta/alpha ratio, $\beta/\alpha$, should be between about 1.1 to about 2.0 and preferably about 1.4 to about 2.0. The intrinsic viscosity ratio may be calculated as follows:

$\beta/\alpha = 1 + (1/fc) [(MF\ homopolymer/MF\ copolymer)^{0.213} - 1.0]$ where fc is the fraction of rubbery copolymer in the impact copolymer.

The random copolymers for use herein contain from about 1 to about 10 weight percent of an alpha-olefin comonomer, e.g., ethylene or 1-butene. Preferably the comonomer content is from about 3 to about 4 weight percent. The melt flow of the random copolymer is between about 15 dg/min to about 70 dg/min.

The polypropylene impact copolymers and random copolymers which are useful in the present invention have a narrow molecular weight distribution, i.e. polydispersity index Q of less than 6.5 where Q is defined as $M_w/M_n$ where $M_w$ is weight average molecular weight and $M_n$ is number average molecular weight. Q is measured by gel permeation chromatography (GPC) as will be understood by those skilled in the art.

The polypropylene polymers useful in the present invention can be produced in slurry polymerization processes conducted in inert hydrocarbon solvents, in bulk polymerization processes conducted in liquefied monomers such as liquefied propylene, and in stirred-bed or fluidized-bed gas phase polymerization processes. Gas phase processes using a fluidized-bed are preferred. Impact copolymers are advantageously made in a two reactor system wherein the propylene homopolymer phase is made in a first reactor and the contents of that reactor are conveyed to a second reactor where a comonomer is added and polymerized to produce a copolymer rubber phase. Such a process provides for in situ blending of the homopolymer phase and the copolymer rubber phase. U.S. Pat. Nos. 4,379,759; 4,728,705; 5,338,790 and 5,674,630 describe processes which could be used to produce propylene polymers which could be cracked to produce the high MF polymers useful in this invention Commonly used catalysts for such systems include:

A. Ziegler-Natta catalysts, including titanium based catalysts such as those described in U.S. Pat. Nos. 4,376,062, 4,379,758 and 5,066,737. Ziegler-Natta catalysts are typically magnesium/titanium/electron donor complexes used in conjunction with an organoaluminum cocatalyst and an external selectivity control agent, such as an alkoxy silane, and B. Metallocene catalysts, i.e., organometallic coordination complexes of one or more ligands in association with a metal atom.

The propylene polymers used in this invention are prepared in accordance with olefin polymerization processes which are well known in the art. Typically in these processes, discrete portions of the catalyst components continually are fed to the reactor in catalytically effective amounts together with the propylene (and possibly comonomer) while the polymer product is continually removed during the continuing process. Fluid bed reactors useful for this purpose are described, e.g., in U.S. Pat. Nos. 4,302,565, 4,302,566 and 4,303,771.

For example, in the preparation of impact copolymers, propylene or a mixture of propylene and a small amount of at least one olefin having 2 to 8 carbon atoms is introduced together with hydrogen and catalyst into the first reactor. The mole ratio of hydrogen to propylene alone or combined propylene and olefin is in the range of about 0.001 to about 0.45 and is preferably about 0.004 to about 0.1.

A mixture of homopolymer or copolymer of propylene with active catalyst embedded in the polymer matrix is produced in the first reactor. This mixture from the first reactor is transferred to the second reactor in which no additional solid catalyst need be added. Additional cocatalyst and/or electron donor optionally may be added to the second reactor. In the second reactor, ethylene and propylene are maintained at a gas phase composition in a range of mole ratio of about 0.1 to about 10 moles of ethylene per mole of propylene, and preferably about 0.1 to about 5.0 moles of ethylene per mole of propylene.

The propylene polymers useful in the present invention may be produced directly in the polymerization reactor using metallocene catalysts or by cracking reactor products to achieve the desired higher melt flows and narrow molecular weight distribution. The cracking or vis-breaking of polymers is a well known technique and involves thermally or chemically degrading the polymers to obtain a lower molecular weight product. Representative processes for cracking polyolefin resins, including polypropylene, are described in U.S. Pat. Nos. 3,144,436; 3,887,534; 4,535,125 and 5,587,434. The cracking may advantageously be accomplished with alkyl peroxides such as 2,5-dimethyl-2,65-bis (t-butylperoxy)hexane or other peroxidic species.

Additives

The polypropylene polymers used as coating layers in the present invention also may contain typical additives such as processing stabilizers, antioxidants, acid acceptors, synergists, nucleating additives and additives which stabilize against radiation, such as ultraviolet (UV) stabilizers and those that provide resistance to gamma irradiation. Antioxidants include the sub-classes of primary and secondary types; examples of primary antioxidants include the hindered phenolic-type additives typified by IRGANOX 1010, IRGANOX 3114 and ETHANOX 330. Their main function is to provide long-term thermal stability such as is often needed in fabricated articles. Secondary antioxidants include those additives that contain phosphorus e.g. organohosphite or organo phosphonite, or sulfur, e.g. thioesters. Examples of phosphites include IRGAFOS 168, ULTRANOX 626, ULTRANOX 627A, ULTRANOX 641, DOVERPHOS S-9228 and IRGAFOS 12. ETHANOX 398 is a fluorop hosphonite. Organophosphonite secondary antioxidants are typified by Sandostab P-EPQ. Another class of secondary antioxidants comprises the benzofuranone (lactone) derivatives as represented by Ciba Specialties' HP-136. These secondary antioxidants function as processing stabilizers by providing needed stability in melt flow and color during the melt processing of the plastic material. Synergists are another class of secondary antioxidants. They function to enhance the (e.g. heat aging stability) of primary antioxidants. Examples include the thioesters of fatty acids typified by DSTDP, DLTDP and DMTDP. Acid acceptors may be categorized as hydrotalcite-like compounds, salts of fatty acids, lactic acid salts and related derivatives, and certain metal oxides. Examples of each type in order include DHT-4A, calcium stearate, calcium lactate, and zinc or magnesium oxide. Ultraviolet stabilization is provided by light absorbers such as TINUVIN 327 or by hindered amine types such as CYASORB UV 3346, TINUVIN 622, TINUVIN 770 DF and CHIMASSORB 944. Resistance against gamma irradiation is provided by combinations of additives such as phosphorus containing secondary antioxidants, hindered amines and mobilizing additives such as mineral oil.

Primary antioxidants include 1,3,5-trimethyl-2,4,6-tris(3, 5-di-tert-butyl-4-hydroxybenzyl)benzene ; octadecyl3-(3', 5'-di-tert-butyl-4'-hydroxyphenyl)propionate ; tetrakis [methylene(3,5-di-tert-butyl-4-hydroxyhydrocinnamate)] methane; tris[3,5-di-t-butyl-4-hydroxybenzyl)isocyanurate; 3,5-di-tert-butyl-4-hydroxyhydrocinnamic acid triester with 1,3,5-tris(2-hydroxyethyl)-s-triazine-2,4,6(1H,3H,5H)-trione; 1,3,5-tris-(4-tert-butyl-3-hydroxy-2,6-dimethylbenzyl) 1,3,5-triazine-2,4,6-(1H,3H,5H)-trione; bis- [3,3-bis(4'hydroxy-3'tert-butyl-phenyl)-butanoic acid]-glycolester; 2,2'-methylene-bis-(4-methyl-6-tertiary-butylphenol)-terephthalate; 2,2 bis[4-(2-(3,5-di-tert-butyl-4-hydroxyhydrocinnamoyloxy))ethoxy-phenyl]propane; calcium bis[monoethyl(3,5-di-tert-butyl-4-hydroxybenzyl) phosphonate]; 1,2-bis(3,5-di-tert-butyl-4-hydroxyhydrocinnamoyl)hydrazine; and 2,2-oxamido bis [ethyl3-(3,5-di-tert-butyl-4-hydroxyphenyl)propionate]. Tetrakis[methylene (3,5-di-tert-butyl-4-hydroxyhydrocinnamate)]methane; tris(3,5-di-tert-butyl-4-hydroxybenzyl)isocyanurate and 1,3, 5-trimethyl-2,4, 6-tris (3, 5-di-tert-butyl-4-hydroxybenzyl) benzene are preferred. While larger amounts of these primary antioxidants may be used, particularly advantageous results are obtained by using less than about 200 ppm by weight, preferably 75 to 200 ppm.

Additional additives may be used separately or blended with the above listed antioxidants. This applies to all of the above additive types and further includes fillers, pigments, flame retardants, slip agents, anti-block agents, and other additives which enhance the properties and processability of the impact copolymer to which they are added.

While the above listing seeks to provide key examples of the different additive types, it is not to be viewed as limited by the examples in scope. It is also recognized that certain of the above additives are multi-functional, e.g., an acid acceptor such as calcium stearate may also provide mold release performance, as may also be the case with glyceryl monostearate. Further, combinations of any or all types of additives given, or of additives within a given class, are considered to be within the scope of the present invention.

Substrate

A wide variety of substrates useful in the present invention will be obvious to the person skilled in the art. The melting point of any useful substrate generally should be greater than or equal to the melting point of the polypropylene coating resins which will be applied via extrusion coating. While not intended to be limiting, examples of specific substrates useful in the present invention include woven fabrics of natural materials such as cotton and wool, woven and non-woven fabrics, sheets and films of synthetic materials such as polyolefins including polypropylene, polyesters including polyethylene terephthalate, polytrimethylene terephthalate and polybutylene terephthalate, polyamides including nylon 6 and nylon 66 and Kraft paper and other paper products. A particularly useful 'substrate is a woven fabric made from synthetic polymer fibers. In a preferred embodiment, the substrate is a woven fabric made from polypropylene which is a homopolymer having a melt flow of about 2 dg/min to about 5 dg/min. Preferably the polypropylene woven fabric is raffia or stretched tape based, which after coating can be converted into bags to store and transport fine powdery materials like cement, flour, etc.

Extrusion Coating

In extrusion coating, a solid substrate, is coated with a thin layer of molten resin which is then cooled and solidified. See Briston, J. H. Plastics Films, Longman, $3^{rd}$ Ed., pp. 325–327 (1988). The coating resin is extruded through a die as a thin molten film and allowed to contact the substrate upon which it solidifies. Typically during such solidification, pressure is applied to the coated substrate, e.g., by a pressure roll. More specifically, the molten polymer is extruded as a continuous film onto the substrate at the nip formed by a cooling roll and a rubber-covered pressure roll over which the substrate travels. Control of substrate width is achieved by fitting adjustable deckles to the slit die. For promoting adhesion of the molten polymer to the substrate a pressure roll is mounted behind the substrate at the point where the resin melt first contacts the cooling roll.

Extrusion Coating Properties

One of the most important features of a satisfactory extrusion coating process is uniform control of certain coating properties such as neck-in, surging, edge weaving and adhesion as well as the surface finish of the final coated substrate. Uniformity of coating properties depends, among other things, on the maintenance of a uniform surface temperature over the whole area of the chill roll.

A factor affecting the adhesion of the molten polymer to the substrate is the distance between the extruder die and the nip between the two rolls. This distance is known as the air gap or draw distance and it is in this region that draw down and neck-in occur. Neck-in is the reduction in width which occurs in the molten film as it leaves the die. Surface oxidation of the melt, which promotes adhesion, also occurs in this region. The separation should, therefore, be sufficient to permit oxidation to occur but must not be large enough to cause an appreciable reduction in melt temperature since the resulting higher viscosity would reduce penetration of the polymer into the substrate. The air gap must also be kept as small as possible to prevent excessive neck-in.

Draw down is the reduction in the thickness of the extruded polymer between the extruder die and the chill roll. Ideally, the required characteristics of an extrusion coating polymer are constant neck-in and high draw down. When neck-in remains uniform, the process can be operated to obtain a higher utilization of the substrate width. Achieving high draw down provides economies in the process by virtue of attaining as thin a film as possible for application to the substrate without pinholing or tearing. The thickness of the applied film is governed by the width of the die opening and the relative speeds of the film and the substrate.

As long as the neck-in is uniform, the processor can adjust the extrusion coating operating conditions to produce an acceptable coated article. However the processor generally cannot rectify the problem of high edge weaving. Edge weaving is the fluctuation of the edge of the melt curtain as it deposits onto the substrate. This fluctuation leads to wastage of substrate and coating resin. Therefore low edge weaving is a very important characteristic of the resin from the processor's viewpoint.

EXAMPLES

A series of eight resins were extrusion coated onto polypropylene woven fabric. The resins included a polypropylene homopolymer, ethylene-propylene random copolymers (at two different ethylene levels) and a propylene impact copolymer cracked to two different melt flow levels. The molecular weight distributions (MWD) of the resins were varied by peroxide cracking.

The resins listed in Table 1 (except in Example 1) were extrusion compounded into pellets using the additive package of IRGANOX 1010 hindered phenolic primary antioxidant (100 ppm), ULTRANOX 626 phosphite processing stabilizer (600 ppm), hydrotalcite DHT4A, Mg Al hydroxy carbonate hydrate (200 ppm) acid neutralizer and peroxide (Lupersol 101), if needed. The additives in Example 1 were IRGANOX 3114 hindered phenolic antioxidant (400 ppm), IRGAFOS 168 phosphite processing stabilizer (1200 ppm), and PATIONIC 1240 Ca lactate acid neutralizer (400 ppm).

The resin of Example 2 was pelletized from homopolymer polypropylene unstabilized powder (3.2 dg/min MF). The resin of Example 3 was cracked from 3.2% $C_2$ random copolymer powder (10.2 dg/min MF). The resins of Examples 4 and 5 were compounded (no peroxide) from powders with two ethylene levels. The resin of Example 6 was cracked from a 3.6% $C_2$ random copolymer powder having a MF of 3.4 dg/min. The resin of Example 7 was cracked from an impact copolymer powder having a rubber content or $F_c$ of 16% and a MF of 3.8 dg/min to pellets having a MF of 20 dg/min. The resin of Example 8 is a 16% $F_c$ impact copolymer having a MF of 45 dg/min (cracked from a 3.8 dg/min MF powder). The impact copolymers have $E_c$ of 60.4% (9.5% total ethylene in the polymer), and a nominal intrinsic viscosity ratio of 1.4.

The impact copolymer of Examples 7 and 8 were prepared by a fluidized bed gas phase polymerization process employing two reactors in series followed by compounding in an extruder with additives and peroxide for melt flow control. In the first polymerization reactor, a polypropylene homopolymer was produced using a Zeigler-Natta type catalyst. The homopolymer produced together with residual catalyst was transferred to the second reactor where ethylene and propylene is added and an ethylene-propylene copolymer is produced in the presence of the homopolymer. In this was, an in situ blend containing 84% homopolymer and 16% rubbery copolymer was prepared. The impact copolymer powder having a MF of 3.8 dg/min was then subjected to catalyst deactivation followed by extrusion compounding with additives and peroxide to produce higher MF pellets.

A polypropylene woven fabric about 229 micrometers thick was coated with a layer of polypropylene resin about 32 micrometers thick. A 6-inch Sterling single screw extruder with 20:1 L/D (length to-diameter) ratio was used. The die gap was 0.61 mm, draw ratio was 19.2 and air gap was 8 inch (20.3 cm). Melt temperature was 288° C. The chill roll,was matted. The Egan die was 84 inch (213 cm) wide; the deckle was set to 70 inch (178 cm) die width. The line speed was 91.4 meter/min. These operating conditions were kept constant during the comparative test; only the resins were varied.

Adhesion was measured by a balloon test, in which the coated fabric was pressurized by air until failure occurred. Neck-in was measured as the difference between die width and average coating width. Surging is the variability of extruder output, leading to non-uniform coating thickness. Surging was evaluated by observing the variation in the elliptical patterns in coated material before winding. Both edge weaving and surging were given a numerical rating between 1 (best) and 10 (worst). The average of a panel of five observers is reported.

Table 1 shows the resin parameters and coating performance results. Table 2 shows the MWD data for the resins tested. The MWD data were generated by high temperature gel permeation chromatography (GPC). The averages measured are number average (Mn), weight average (Mw) and z-average (Mz). The ratio Mw/Mn (Q) is regarded as a polydispersity index. As can be seen from Table 1, the resins of Examples 6 and 8 which illustrate the present invention provided the best overall balance of performance, with high adhesion, low edge weaving and low surging.

TABLE 1

Extrusion coating performance

| Example | MF (gm/10 min) | Resin Type | Cracked (Cr) or Reactor (Rx) | Adhesion (psi) | Neck-in (inch) | Edge weaving rating (a) | Surging Rating (a) |
|---|---|---|---|---|---|---|---|
| 1 | 20 | Homo | Rx | 4.5 | 9 | 2 | 7 |
| 2 | 22 | Homo | Cr | 7 | 9 | 8 | 3.5 |
| 3 | 24 | 3.2 C₂ rand | Cr | 9.5 | 9 | 9 | 2 |
| 4 | 25 | 3.2 C₂ rand | Rx | 8.2 | 9 | 5 | 8 |
| 5 | 25 | 3.6 C₂ rand | Rx | 9 | 9 | 4 | 8 |
| 6 | 20 | 3.6 C₂ rand | Cr | 9.8 | 9 | 3 | 2 |
| 7 | 20 | 16 F$_c$ impact | Cr | 10 | 10 | 3.5 | 8 |
| 8 | 45 | 16 F$_c$ impact | Cr | 10 | 12 | 2 | 1 |

Note: (a) 1 = Best; 10 = Worst

TABLE 2

Molecular weight distribution data for resins tested

| Resin | Mn/1000 | Mw/1000 | Mz/1000 | Mw/Mn (Q) |
|---|---|---|---|---|
| 1 | 26.2 | 220 | 900 | 8.4 |
| 2 | 32.0 | 185 | 560 | 5.8 |
| 3 | 25.9 | 196 | 720 | 7.5 |
| 4 | 24.8 | 210 | 880 | 8.5 |
| 5 | 24.5 | 203 | 870 | 8.3 |
| 6 | 32.3 | 184 | 540 | 5.7 |
| 7 | 25.2 | 186 | 640 | 7.4 |
| 8 | 22.9 | 141 | 485 | 6.2 |

I claim:

1. An extrusion coating composition comprising a propylene impact copolymer having the following properties:
   (i) an $E_c$ of about 55% wt to about 60% wt,
   (ii) an $F_c$ of about 1,0% wt to about 35% wt,
   (iii) an intrinsic vicosity ratio of from 1.1 to 2.0
   (iv) a melt flow of 30 dg/min to 70 dg/min, and
   (v) a Q value of less than 6.5.

2. The composition of claim 1 which further includes:
   (c) an effective stabilizing amount of a hindered phenolic primary antioxidant, said amount being less than 200 ppm by weight.

3. The composition of claim 2 which further includes:
   (d) a phosphite processing stabilizer, and
   (e) an acid acceptor.

4. A composite article comprising a substrate and extrusion coated thereon the extrusion coating composition of claim 1.

5. The article of claim 4 wherein the propylene polymer has been peroxide cracked.

6. The article of claim 4 wherein the propylene impact copolymer has an intrinsic viscosity ratio of 1.4 to 2.0.

7. The article of claim 4 wherein the substrate is a woven or non-woven polyolefin.

8. The article of claim 4 wherein the substrate is a polyester.

9. The article of claim 4 wherein the substrate is a polyamide.

10. The article of claim 4 wherein the substrate is a polypropylene woven fabric.

11. The article of claim 4 wherein the extrusion coating composition further contains 75 to 200 ppm by weight of a hindered phenolic primary antioxidant.

12. The article of claim 11 wherein the extrusion coating composition further contains a phosphite processing stabilizer and an acid acceptor.

13. A process for coating a substrate which comprises melt extruding onto such substrate at least an extrusion coating composition according to claim 1.

14. The process of claim 13 wherein the propylene polymer has been peroxide cracked.

15. The process of claim 13 wherein the propylene impact copolymer has an intrinsic viscosity ratio of 1.4 to 2.0.

16. The process of claim 13 wherein the substrate is a polypropylene woven fabric.

* * * * *